(12) United States Patent
Kamuda et al.

(10) Patent No.: US 9,342,929 B2
(45) Date of Patent: May 17, 2016

(54) MIXED REALITY EXPERIENCE SHARING

(71) Applicant: MICROSOFT TECHNOLOGY LICENSING, LLC, Redmond, WA (US)

(72) Inventors: Nicholas Kamuda, Seattle, WA (US); Peter Tobias Kinnebrew, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 13/747,328

(22) Filed: Jan. 22, 2013

(65) Prior Publication Data

US 2014/0204077 A1 Jul. 24, 2014

(51) Int. Cl.
*G06T 17/05* (2011.01)
*G06T 19/00* (2011.01)
*G02B 27/00* (2006.01)
(Continued)

(52) U.S. Cl.
CPC .............. *G06T 19/006* (2013.01); *G02B 27/00* (2013.01); *G06T 15/04* (2013.01); *G06T 17/00* (2013.01); *A63F 2300/1093* (2013.01); *A63F 2300/205* (2013.01); *A63F 2300/407* (2013.01); *A63F 2300/63* (2013.01); *A63F 2300/695* (2013.01); *G06T 2219/024* (2013.01)

(58) Field of Classification Search
CPC ......... G06T 17/20; G06T 17/05; G06T 17/00; G06T 15/00; G06T 15/10; G06T 19/00; G06T 15/04; G06T 19/006; G02B 27/00
See application file for complete search history.

(56) References Cited

U.S. PATENT DOCUMENTS 6,972,734 B1 12/2005 Ohshima et al.
7,532,224 B2 5/2009 Bannai
(Continued)

FOREIGN PATENT DOCUMENTS

CA 2821066 A1 6/2012
EP 2463645 A1 6/2012
(Continued)

OTHER PUBLICATIONS

"Charlie and the virtual chocolate factory", Retrieved at <<http://bpmredux.wordpress.com/tag/mixed-reality/>>, Sep. 7, 2011, pp. 4.
(Continued)

*Primary Examiner* — Abderrahim Merouan
*Assistant Examiner* — Michelle Chin
(74) *Attorney, Agent, or Firm* — Dan Choi; Judy Yee; Micky Minhas

(57) ABSTRACT

Embodiments that relate to presenting a textured shared world model of a physical environment are disclosed. One embodiment includes receiving geo-located crowd-sourced structural data items of the physical environment. The structural data items are stitched together to generate a 3D spatial shared world model. Geo-located crowd-sourced texture data items are also received and include time-stamped images or video. User input of a temporal filter parameter is used to temporally filter the texture data items. The temporally-filtered texture data items are applied to surfaces of the 3D spatial shared world model to generate a textured shared world model of the physical environment. The textured shared world model is then provided for display by a display device.

17 Claims, 6 Drawing Sheets

(51) Int. Cl.
*G06T 15/04* (2011.01)
*G06T 17/00* (2006.01)

(56) References Cited

U.S. PATENT DOCUMENTS

| | | | |
|---|---|---|---|
| 2009/0310851 | A1 | 12/2009 | Arcas et al. |
| 2011/0179020 | A1* | 7/2011 | Ozzie et al. ............ 707/723 |
| 2011/0254916 | A1* | 10/2011 | Fan et al. ............... 348/41 |
| 2012/0306850 | A1 | 12/2012 | Balan et al. |
| 2013/0222369 | A1 | 8/2013 | Huston et al. |

FOREIGN PATENT DOCUMENTS

| | | |
|---|---|---|
| WO | 2011/041618 A2 | 4/2011 |
| WO | 2011/067713 A2 | 6/2011 |

OTHER PUBLICATIONS

Brown, et al., "Lessons from the lighthouse: Collaboration in a shared mixed reality system", Retrieved at <<http://eprints.gla.ac.uk/3428/1/CHIlighthousepaper.pdf>>, In: Conference on Human Factors in Computing Systems, Apr. 5, 2003, pp. 577-584.

Fisher, Scott S., "An authoring toolkit for mixed reality experiences", Retrieved at <<http://www.itofisher.com/PEOPLE/sfisher/Authoring_Toolkit_for_Mixed_Reality-IWEC2002.pdf>>, International Workshop on. Entertainment Computing (IWEC), Jan. 14, 2002, pp. 487-494.

Pellerin, et al., "SoundPark: Exploring Ubiquitous Computing through a Mixed Reality Multiplayer Game Experiment", Retrieved at <<http://www.cim.mcgill.ca/~nicolas/notere2009-v1.3.pdf>>, In the conference NOTERE 2009. vol. 8, No. 3, Jun. 23, 2008, pp. 7.

Hamza-Lup, et al., "Sensors in Distributed Mixed Reality Environments", Retrieved at <<http://www.iiisci.org/Journal/CV$/sci/pdfs/P476633.pdf>>, Journal of Systemics, Cybernetics and Informatics, vol. 3(2), Retrieved Date: Mar. 30, 2012, pp. 96-101.

ISA European Patent Office, International Search Report & Written Opinion for PCT Patent Application No. PCT/US2014/011561, Jun. 30, 2014, WIPO, 20 Pages.

Fritz, F. et al., "Enhancing Cultural Tourism Experiences with Augmented Reality Technologies," Proceedings of the 6th International Symposium on Virtual Reality, Archaeology and Cultural Heritage, Nov. 2005, 6 Pages.

Benko, H. et al., "Collaborative Mixed Reality Visualization of an Archaeological Excavation," Proceedings of the Third IEEE and ACM International Symposium on Mixed and Augmented Reality, Nov. 2004, 9 Pages.

European Patent Office, Office Action Issued in European Patent Application No. 14704203.0, Jan. 26, 2016, Germany, 3 pages.

* cited by examiner

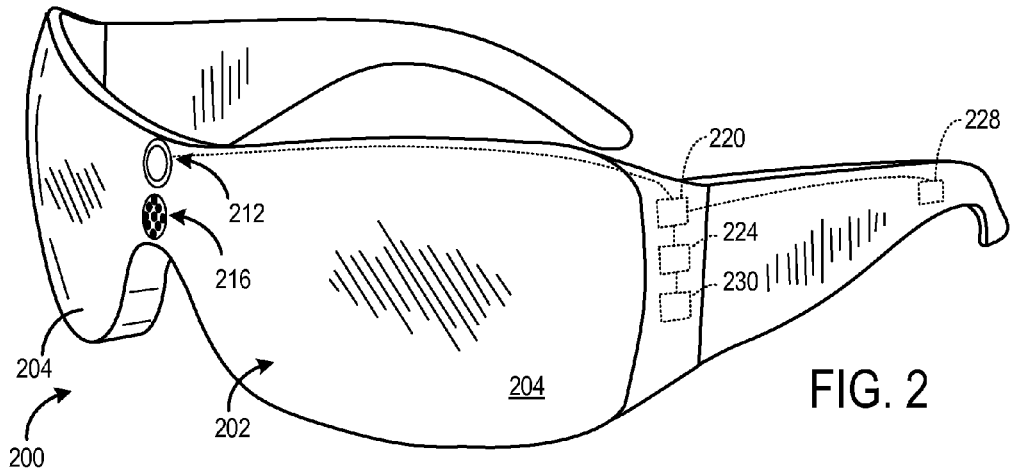
FIG. 2
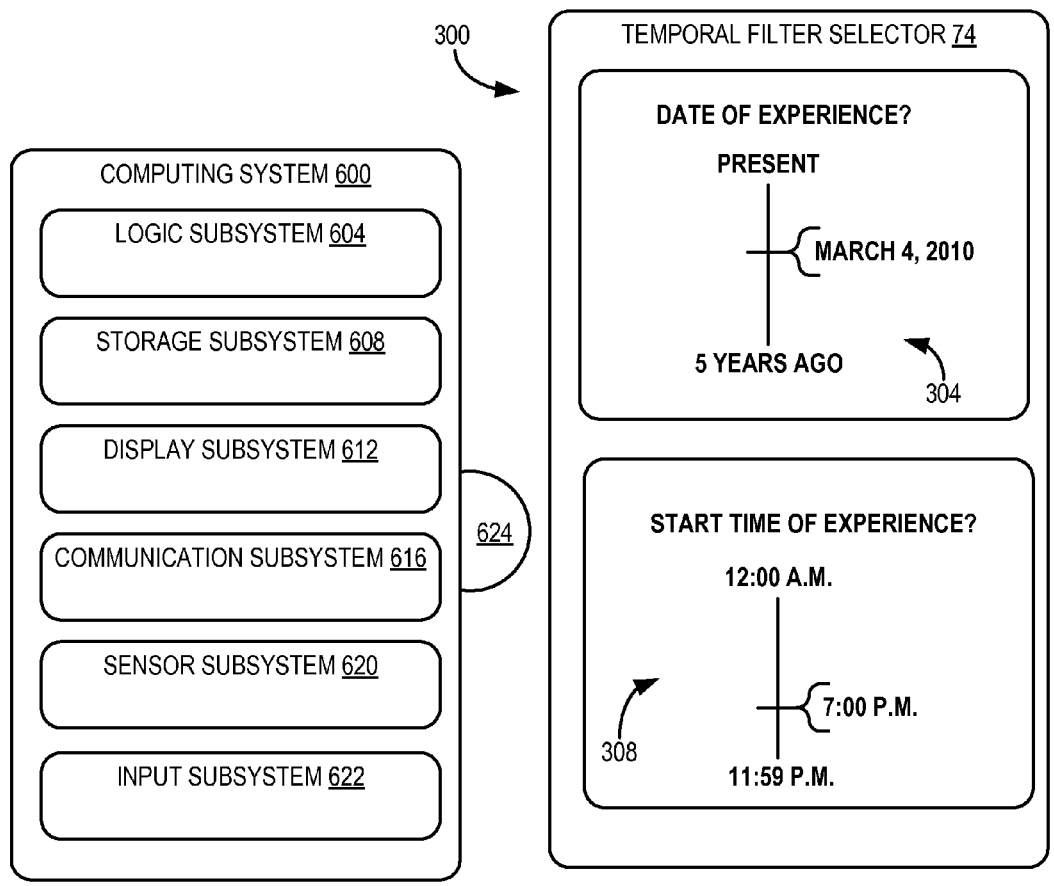
FIG. 6
FIG. 3

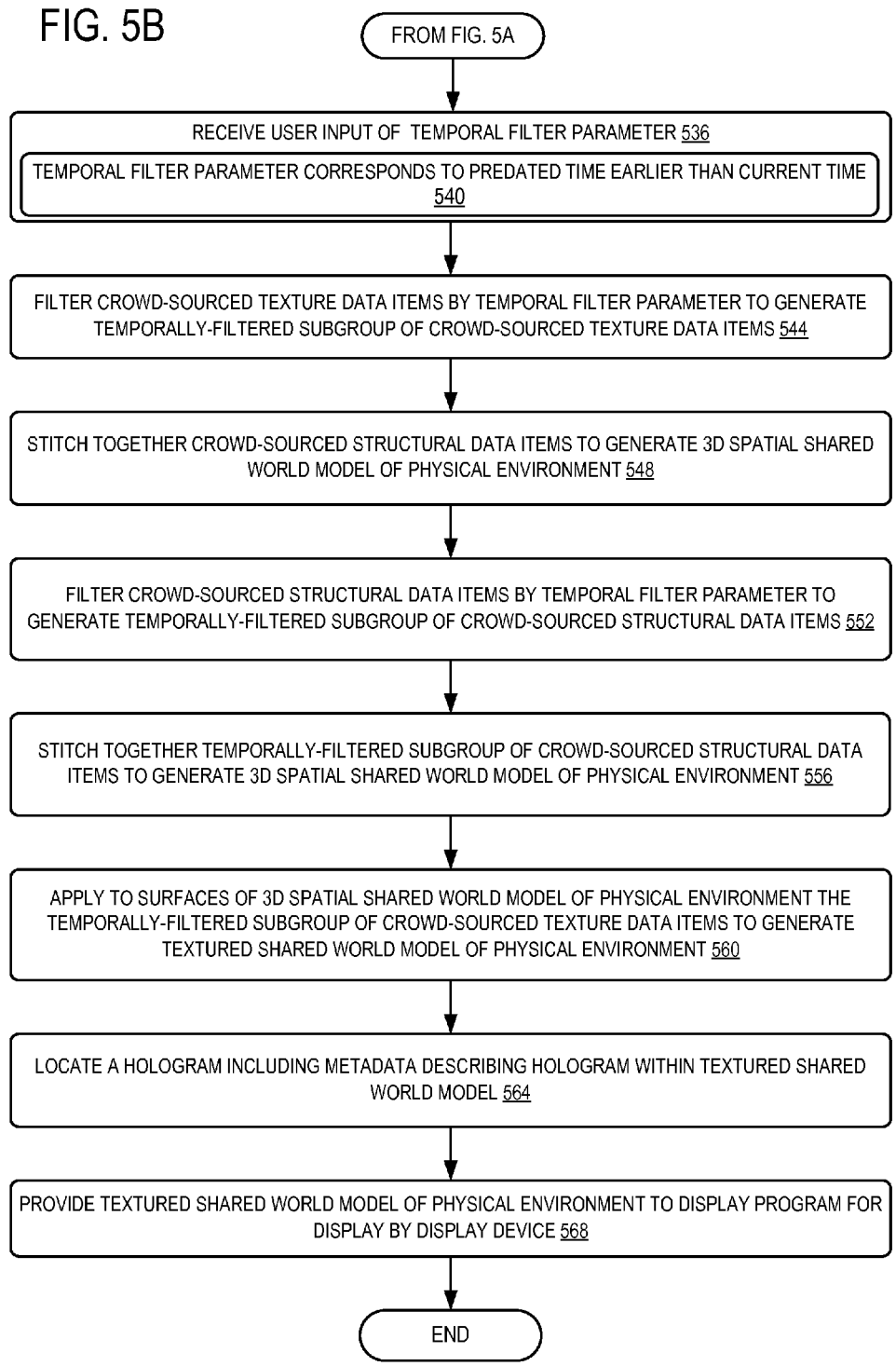

MIXED REALITY EXPERIENCE SHARING

BACKGROUND

Mixed reality or augmented reality display devices, such as head-mounted display devices, may be used in a variety of real-world environments and contexts. Such devices may include various sensors for collecting data, such as images, depth information, audio, etc., from the surrounding environment. Users of mixed reality devices may capture various experiences by collecting data while engaged in the experiences.

A person may desire to view a current experience and/or re-experience one or more experiences captured by multiple users of mixed reality devices. Similarly, one or more users of such devices may desire to share an experience with a third party. Unfortunately, the ability to combine and manage data from multiple mixed reality devices in a manner conducive to conveniently sharing rich mixed reality experiences has heretofore been limited.

SUMMARY

Various embodiments are disclosed herein that relate to presenting a textured shared world model of a physical environment for display by a display device. For example, one disclosed embodiment provides a method for presenting a textured shared world model of a physical environment via a display device. The method includes receiving crowd-sourced structural data items that are geo-located at the physical environment and include depth information. The crowd-sourced structural data items are stitched together to generate a 3D spatial shared world model of the physical environment.

Crowd-sourced texture data items that are geo-located at the physical environment are also received from a plurality of sources. Each of the texture data items includes a time-stamped image or time-stamped video. User input of a temporal filter parameter is received and used to filter the crowd-sourced texture data items to generate a temporally-filtered subgroup of the texture data items. The temporally-filtered subgroup of the crowd-sourced texture data items is applied to surfaces of the 3D spatial shared world model of the physical environment to generate the textured shared world model of the physical environment. The textured shared world model of the physical environment is then provided to a display program for display by the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example head-mounted display device according to an embodiment of the present disclosure.

FIG. 3 is a schematic view of a temporal filter selector presented in a graphical user interface.

FIGS. 5A and 5B are a flow chart of a method for presenting a textured shared world model of a physical environment according to an embodiment of the present disclosure.

FIG. 6 is a simplified schematic illustration of an embodiment of a computing system.

DETAILED DESCRIPTION

Figure 1:
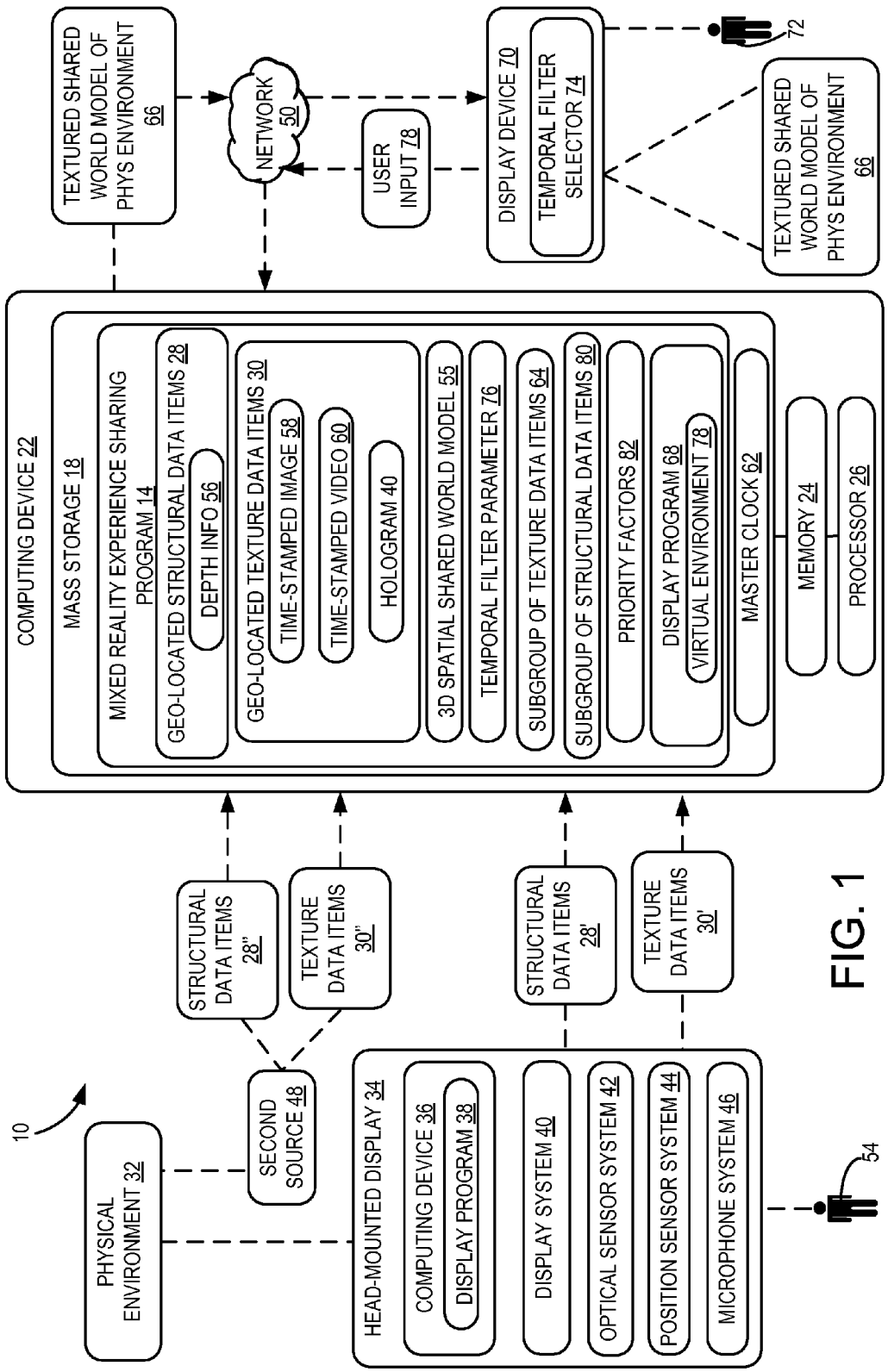
FIG. 1 is a schematic view of a mixed reality experience sharing system according to an embodiment of the present disclosure.

FIG. 1 shows a schematic view of one embodiment of a mixed reality experience sharing system 10. The mixed reality experience sharing system 10 includes a mixed reality experience sharing program 14 that may be stored in mass storage 18 of a computing device 22. The mixed reality experience sharing program 14 may be loaded into memory 24 and executed by a processor 26 of the computing device 22 to perform one or more of the methods and processes described in more detail below.

The computing device 22 may take the form of a network computer, home entertainment computer, desktop computing device, mobile computing device such as a smart phone, laptop, notebook or tablet computer, or other suitable type of computing device. Additional details regarding the components and computing aspects of the computing device 22 are described in more detail below with reference to FIG. 6.

As explained in more detail below, the mixed reality experience sharing program 14 may receive crowd-sourced data comprising geo-located structural data items 28 and geo-located texture data items 30 from multiple sources. As shown in FIG. 1, in one example such crowd-sourced data may relate to a physical environment 32 and aspects of that environment that are captured by data capture devices. The geo-located structural data items 28 may include, but are not limited to, depth information related to structures, objects, and corresponding surfaces in the physical environment 32. The geo-located texture data items 30 may include, but are not limited to, light, still and video images and other data items that may be applied to surfaces represented in the geo-located structural data items 28. The geo-located texture data items 30 may also include other data items related to the physical environment 32, such as audio recorded from the physical environment and holograms and other virtual images geo-located in the physical environment.

The crowd-sourced geo-located structural data items 28 and geo-located texture data items 30 may be captured by multiple capture devices and received from such devices via one or more network connections (not shown). One or more of the capture devices may take the form of a head-mounted display (HMD) device 34 that delivers images to the eyes of a user 54. In this example, the HMD device 34 includes a computing device 36 on which a display program 38 is stored. The display program 38 may generate a virtual environment for display via a display system 40 to create a mixed reality environment. The virtual environment may include one or more virtual images, such as two-dimensional (2D) virtual objects and three-dimensional (3D) holographic objects. Additional details regarding the components and computing aspects of the computing device 36 are described in more detail below with reference to FIG. 6.

With reference now also to FIG. 2, one example of an HMD device 200 in the form of a pair of wearable glasses with a transparent display 202 is provided. It will be appreciated that in other examples, the HMD device 200 may take other suitable forms in which a transparent, semi-transparent or non-transparent display is supported in front of a viewer's eye or eyes. It will also be appreciated that the HMD device 34 shown in FIG. 1 may take the form of the HMD device 200, as described in more detail below, or any other suitable HMD device. Additionally, many other types and configurations of capture devices having various form factors may also be used within the scope of the present disclosure. Such capture devices may include, but are not limited to, digital still cameras, digital video cameras, depth cameras, smart phones, tablet computers, and other suitable capture devices and combinations of the foregoing capture devices.

With reference to FIGS. 1 and 2, in this example the HMD device 34 includes a display system 40 and transparent display 202 that enables images to be delivered to the eyes of a user. The transparent display 202 may be configured to visually augment an appearance of physical environment 32 to user 54 viewing the physical environment through the transparent display. For example, the appearance of the physical environment 32 may be augmented by graphical content (e.g., one or more pixels each having a respective color and brightness) that is presented via the transparent display 202 to create a mixed reality environment.

The transparent display 202 may also be configured to enable user 54 to view a physical, real-world object in the physical environment 32 through one or more partially transparent pixels that are displaying a virtual object representation. In one example, the transparent display 202 may include image-producing elements located within lenses 204 (such as, for example, a see-through Organic Light-Emitting Diode (OLED) display). As another example, the transparent display 202 may include a light modulator on an edge of the lenses 204. In this example the lenses 204 may serve as a light guide for delivering light from the light modulator to the eyes of user 54. Such a light guide may enable user 54 to perceive a 3D holographic image located within the physical environment 32 that the user is viewing, while also allowing the user to view physical objects in the physical environment.

As noted above, the HMD device 34 also includes various sensors, components and related systems for capturing data from the physical environment 32. For example, the HMD device 34 includes an optical sensor system 42 that utilizes at least one outward facing sensor 212, such as an optical sensor. Outward facing sensor 212 may detect movements within its field of view, such as gesture-based inputs or other movements performed by a user or by a person or physical object within the field of view. Outward facing sensor 212 may also capture two-dimensional image information and depth information from physical environment 32 and physical objects within the environment. For example, outward facing sensor 212 may include a depth camera, a visible light camera, an infrared light camera, and/or a position tracking camera. As discussed in more detail below, such image information may be delivered to the mixed reality experience sharing program 14 in the form of geo-located texture data items 30'. Such depth information may also be delivered to the mixed reality experience sharing program 14 in the form of geo-located structural data items 28'.

The HMD device 34 includes one or more depth cameras for sensing and generating depth information. In one example, each depth camera may include left and right cameras of a stereoscopic vision system. Time-resolved images from one or more of these depth cameras may be registered to each other and/or to images from another optical sensor such as a visible spectrum camera, and may be combined to yield depth information in the form of depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

The HMD device 34 may also include a position sensor system 44 that utilizes one or more motion sensors 224 to enable position tracking and/or orientation sensing of the HMD device. For example, the position sensor system 44 may be utilized to determine a head pose orientation of a user's head. In one example, position sensor system 44 may comprise an inertial measurement unit configured as a six-axis or six-degree of freedom position sensor system. This example position sensor system may, for example, include three accelerometers and three gyroscopes to indicate or measure a change in location of the HMD device 34 within three-dimensional space along three orthogonal axes (e.g., x, y, z), and a change in an orientation of the HMD device about the three orthogonal axes (e.g., roll, pitch, yaw).

Position sensor system 44 may also support other suitable positioning techniques, such as GPS or other global navigation systems. Further, while specific examples of position sensor systems have been described, it will be appreciated that other suitable position sensor systems may be used.

In some examples, motion sensors 224 may also be employed as user input devices, such that user 54 may interact with the HMD device 34 via gestures of the neck and head, or even of the body. The HMD device 34 may also include a microphone system 46 that includes one or more microphones 220 for capturing audio from the surrounding environment. In other examples, audio may be presented to the user via one or more speakers 228 on the HMD device 34.

The HMD device 34 may also include a processor 230 having a logic subsystem and a storage subsystem, as discussed in more detail below with respect to FIG. 6, that are in communication with the various sensors and systems of the HMD device. In one example, the storage subsystem may include instructions that are executable by the logic subsystem to receive signal inputs from the sensors and forward such inputs to computing device 36 (in unprocessed or processed form), and to present images to a user via the transparent display 202.

As noted above, image information and depth information captured by the HMD device 34 may be provided to the mixed reality experience sharing program 14 in the form of geo-located structural data items 28' and geo-located texture data items 30'. In one example and as explained in more detail below, the mixed reality experience sharing program 14 stitches together such input with other input related to the physical environment 32 and received from other sources, such as the second source 48 shown in FIG. 1. It will be appreciated that the second source 48 may comprise an HMD device in the form of HMD device 34 described herein, any other form of HMD device, or any other suitable capture device.

It will also be appreciated that the HMD device 34 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 34 may include additional and/or alternative sensors, cameras, microphones, input devices, output devices, etc. without departing from the scope of this disclosure. Further, the physical configuration of the HMD device 34 and its various sensors and subcomponents may take a variety of different forms without departing from the scope of this disclosure.

With reference again to FIG. 1, second source 48 may also provide geo-located structural data items 28" and geo-located texture data items 30" that are related to the physical environment 32 to the mixed reality experience sharing program 14. It will be appreciated that such geo-located structural data items 28" and geo-located texture data items 30" reflect data received by the second source 48 from a location relative to the physical environment 32 that may be approximately the same location or a different location from the location of the HMD device 34 relative to the physical environment. As explained in more detail below, geo-located structural data items 28" and geo-located texture data items 30" may also reflect data captured by the second source 48 at a time that is the same or different from a time that geo-located structural data items 28' and geo-located texture data items 30' are captured by the HMD device 34. It will also be appreciated that in other examples, additional sources may provide additional geo-located structural data items and/or geo-located texture data items related to the physical environment 32 to the mixed reality experience sharing program 14.

The mixed reality experience sharing program 14 may stitch together crowd-sourced geo-located structural data items received from multiple sources, indicated at 28 and including depth information 52, to generate a 3D spatial shared world model 55 of the physical environment 32. In this manner, the mixed reality experience sharing program 14 may utilize geo-located structural data items from multiple sources that may reflect, in some examples, different viewpoints of the same physical environment 32, to generate the 3D spatial shared world model 55. The mixed reality experience sharing program 14 then applies to surfaces of the 3D spatial shared world model 55 a subgroup 64 of the crowd-sourced geo-located texture data items 30 to create a textured shared world model 66 of the physical environment 32.

The mixed reality experience sharing program 14 may include a display program 68 for generating images via a display device, such as the display device 70. The mixed reality experience sharing program 14 may utilize the display program 68 to provide the textured shared world model 66 of the physical environment 32 to the display device 70, via network 50, for presentation to a user 72 of the display device.

In one example, the display device 70 may be a monitor that displays two-dimensional (2D) and/or three-dimensional (3D) images via a display program. Such a monitor may take the form of a television, desk-top display, handheld display, or other portable display. In other examples the display device 70 may take the form of an HMD device worn by user 72. It will be appreciated that any suitable display device may be used for display device 70 and is within the scope of this disclosure. It will also be appreciated that network 50 may take the form of a local area network (LAN), wide area network (WAN), wired network, wireless network, personal area network, or a combination thereof, and may include the Internet.

As noted above, in some examples geo-located structural data items 28" and geo-located texture data items 30" may be captured by the second source 48 at a time that is the different from a time that geo-located structural data items 28' and geo-located texture data items 30' are captured by the HMD device 34. To enable the mixed reality experience sharing program 14 to temporally organize the data items it receives, the HMD device 34 and second source 48 may time-stamp the geo-located structural data items and geo-located texture data items they capture to reflect the date and time such items were captured. As shown in FIG. 1, in one example the crowd-sourced geo-located texture data items 28 include time-stamped images 58 and time-stamped video 60.

The mixed reality experience sharing program 14 may include a master clock 62 that may temporally synchronize the time-stamped geo-located structural data items 28 and time-stamped geo-located texture data items 30 received by the program. In other examples, the master clock 62 may also time-stamp geo-located structural data items 28 and geo-located texture data items 30 that are received by the program without a time-stamp.

Advantageously, and as explained in more detail below, in this manner the mixed reality experience sharing program 14 may create a textured shared world model 66 of a physical environment that corresponds to a particular moment in time or period of time. Such moment or period of time may be approximately live or current, or may be predated to an earlier date and time. For example, in some examples mixed reality experience sharing program 14 may filter the crowd-sourced geo-located texture data items 30 by a temporal filter parameter received from the user 72 of the display device 70.

With reference now also to FIG. 3, in one example a temporal filter selector 74 may be presented to the user 72 via a graphical user interface 300 displayed by the display device 70. In this example the temporal filter selector 74 includes a date slider 304 and a time slider 308. Using the date slider 304 and the time slider 308, the user 72 may select a temporal filter parameter 76 that represents a present or predated date and time that the user would like to experience a textured shared world model of a physical environment. It will be appreciated that the temporal filter selector 74 may be presented and/or implemented in a variety of other manners and with a variety of other input interfaces, such as a voice recognition or other natural user interface.

The display device 70 may provide user input 78 comprising a temporal filter parameter 76 selected by the user 72 to the mixed reality experience sharing program 14 via network 50. The mixed reality experience sharing program 14 may then filter the geo-located crowd-sourced texture data items 30 according to the temporal filter parameter 76 to generate a temporally-filtered subgroup 64 of the crowd-sourced geo-located texture data items. In some examples, the mixed reality experience sharing program 14 may also filter the geo-located crowd-sourced structural data items 28 according to the temporal filter parameter 76 to generate a temporally-filtered subgroup 80 of the crowd-sourced geo-located structural data items.

With reference now to FIGS. 1, 4A, 4B, and 5, example use cases of the mixed reality experience sharing system 10 of the present disclosure will now be described. In one example and with reference to FIGS. 1 and 4A, user 72 of display device 70 may be considering visiting the Hotel Bar 402 located in Hotel A, 1000 Main St., Anytown, Calif. The user 72 may desire to virtually visit the bar 402 to see the level of current activity in the bar. Accordingly, the user 72 may input a request to display device 70 to display a current textured shared world model of the bar 402.

The user 72 may input this request using any suitable input device or means, such providing the name and address of the Hotel Bar 402 to the display device 70 via voice recognition. Additionally, to specify that the user desires to see the current activity in the bar 402, the user may use the temporal filter selector 74 and date slider 304 to specify "Present" for the temporal filter parameter which is provided to the mixed reality experience sharing program 14.

Figure 4A:
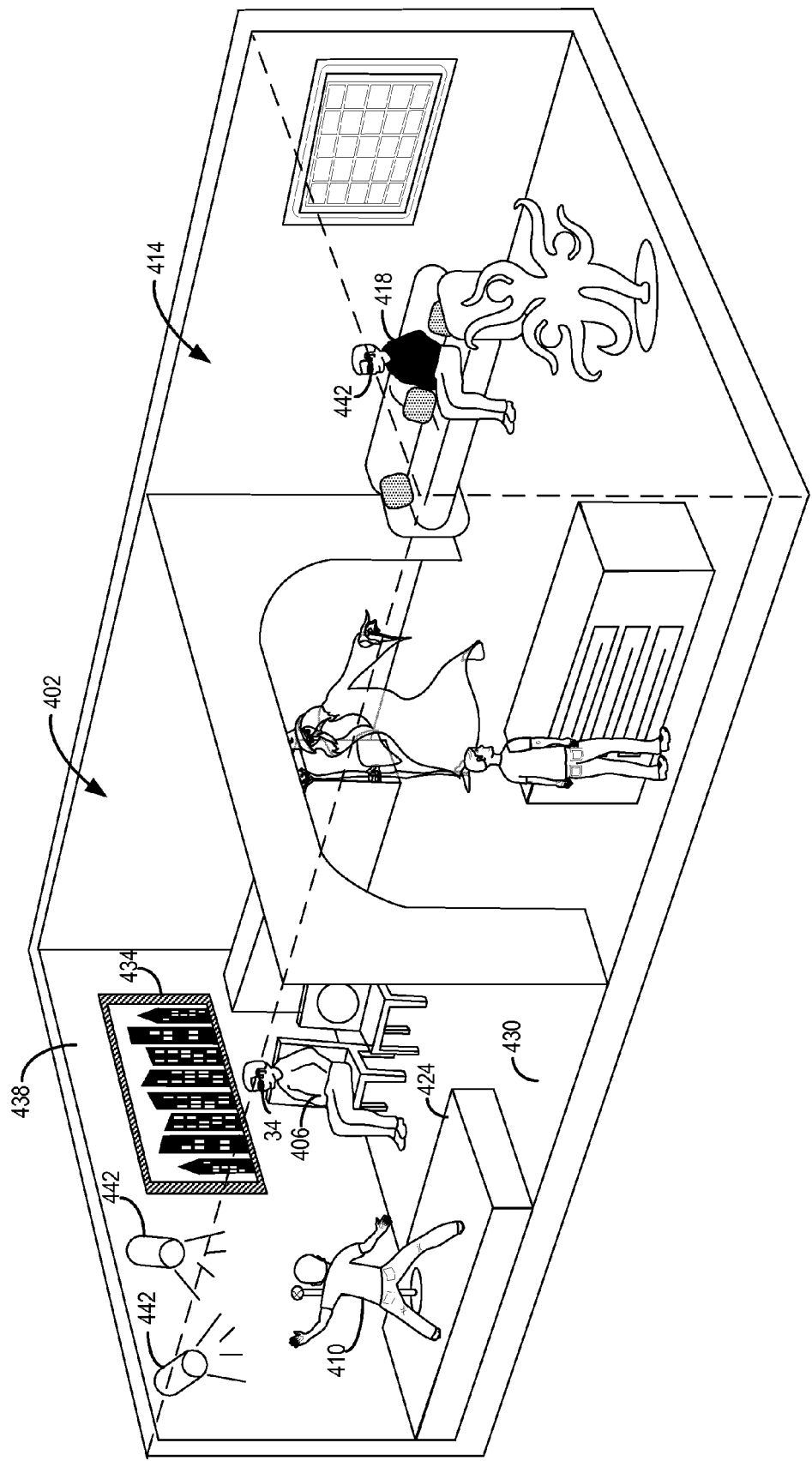
FIG. 4A is a schematic view of a hotel lobby and bar in which users wearing head-mounted display devices are located.

With reference to FIG. 4A, currently patron Alex 406 is sitting in hotel bar 402 and enjoying the performance of lounge singer 410. Patron Alex 406 is wearing HMD device 34 which has been capturing structural data items, including depth information, and texture data items from the hotel bar 402 and adjacent hotel lobby 414 since patron Alex arrived one hour ago. Patron Bruce 418 is currently sitting in the hotel lobby 414. Patron Bruce 418 is also wearing an HMD device 422 that has been capturing structural data items, including depth information, and texture data items from the hotel lobby 414 and bar 402. Patron Bruce 418 can also see lounge singer 410 from his position in the lobby 414.

The mixed reality experience sharing program 14 stitches together the geo-located structural data items related to the bar 402 that have previously been received and are currently being received from patron Alex's HMD device 34 and patron Bruce's HMD device 422. Using location, depth, head pose, and other information from the structural data items, the mixed reality experience sharing program 14 generates a 3D spatial shared world model of bar 402 that is a synthesis of the geo-located structural data items from Alex's HMD device 34 and Bruce's HMD device 422.

It will also be appreciated that the mixed reality experience sharing program 14 may have previously received additional geo-located structural data items related to the bar 402 from previous visits to the bar by patron Alex 406, patron Bruce 418, and/or other persons having capture devices who visited the bar. Such previously received geo-located time-stamped structural data items may be stored in memory 24, and may also be used by the mixed reality experience sharing program 14 to generate a more comprehensive and/or higher fidelity 3D spatial shared world model of the bar 402.

The mixed reality experience sharing program 14 also receives geo-located texture data items related to the bar 402 from patron Alex's HMD device 34 and patron Bruce's HMD device 422. One example of geo-located texture data items includes an image of light illuminating one or more of the geo-located structural data items. For example, such an image of light may include light illuminating the stage 424 on which lounge singer 410 is performing or the floor 430 of the bar 402. Another example of a geo-located texture data item includes an image of an object in the bar 402. For example, such an image of an object may include an image of the painting 434 hanging on the wall 438 of the bar 402. Another example of a geo-located texture data item includes a video of an object in the bar 402. For example, such a video may include video of the lounge singer 410 performing. Another example of a geo-located time-stamped texture data item includes audio of the bar 402. For example, audio of the bar may include audio of the lounge singer 410 singing. It will be appreciated that many other examples of geo-located texture data items may also be received.

Additionally, the mixed reality experience sharing program 14 may have previously received additional geo-located textural data items related to the bar 402 from previous visits to the bar by patron Alex 406, patron Bruce 418, and/or from other persons having capture devices who visited the bar. Such previously received geo-located textural data items may also be stored in memory 24.

In the present example, the mixed reality experience sharing program 14 uses the "Present" temporal filter parameter to filter the geo-located crowd-sourced time-stamped texture data items related to the bar 402, thereby generating a "Present" subgroup of the texture data items corresponding to the present moment in time. The mixed reality experience sharing program 14 then applies to surfaces of the 3D spatial shared world model of the bar 402 the "Present" subgroup of the texture data items to generate a textured shared world model of the bar. For example, images of light from spotlights 442 illuminating the surface of the stage 424 may be applied to the stage surface in the 3D spatial shared world model. In another example, a video of the lounge singer 410 may be applied to locate the lounge singer on the surface of the stage 424. It will be appreciated that the textured shared world model may comprise a single image, a series of images, and/or video of the bar 402.

Figure 4B:
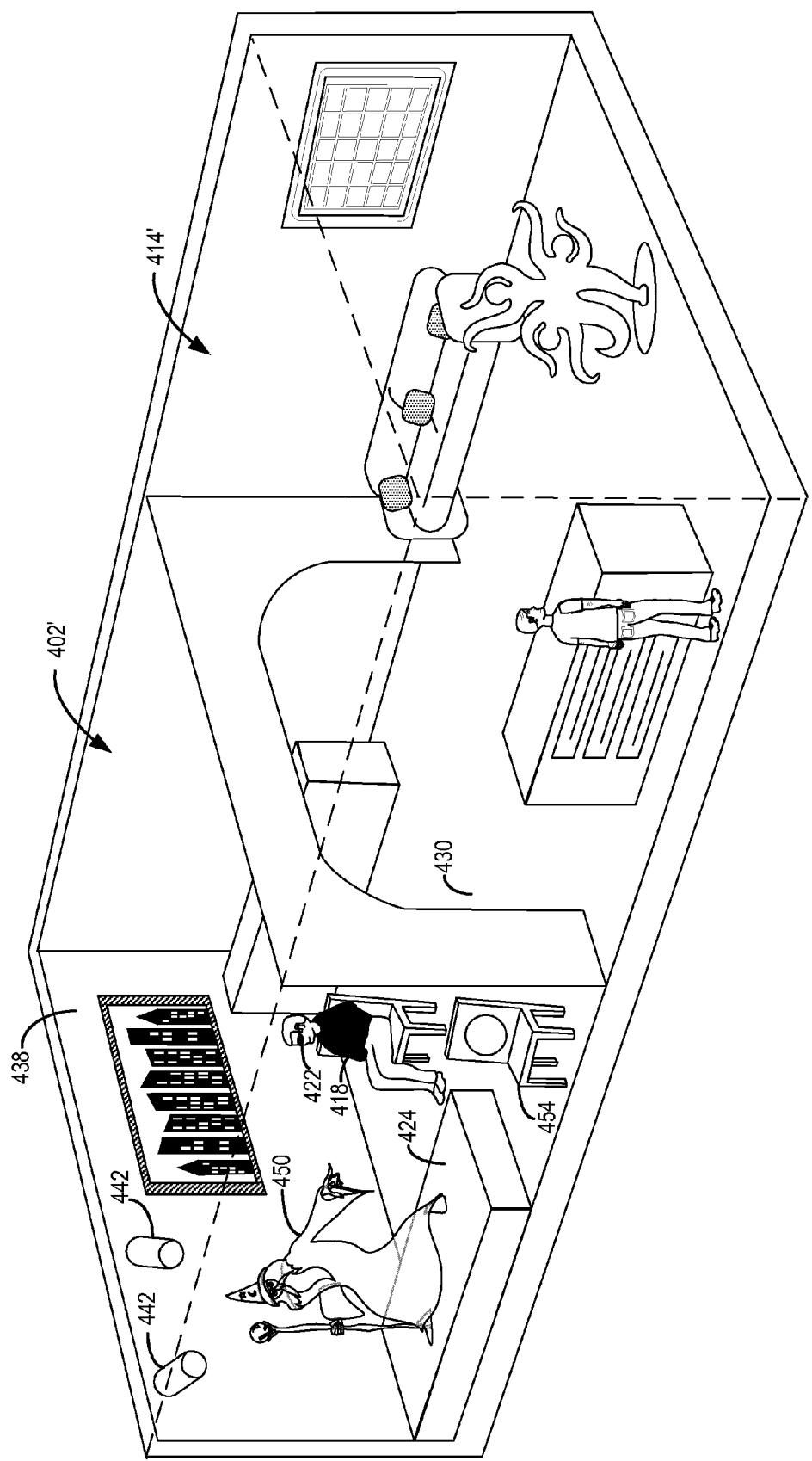
FIG. 4B is a schematic view of the hotel lobby and bar of FIG. 4A at an earlier data and time.

In another example, the user 72 may select a predated temporal filter parameter corresponding to an earlier date and time at the Hotel Bar 402. With reference now to FIG. 4B, this figure illustrates the Hotel Bar 402' and hotel lobby 414' at an earlier time, such as 7:00 pm on Mar. 4, 2010. In this example, the geo-located crowd-sourced texture data items are filtered to generate a subgroup comprising images and video that have a timestamp of 7:00 pm on Mar. 4, 2010.

As shown in FIG. 4B, on this date and time patron Bruce 418 was sitting in the Hotel Bar 402' and viewing a holographic wizard 450 that was geo-located on the stage 424. Spotlights 442 were turned off and chair 454 was in a different location as compared to its location at the current time shown in FIG. 4A. Accordingly, in this example the textured shared world model of the bar 402' presented to the user 72 comprises the geo-located crowd-sourced texture data items that were captured by the HMD device 422 of patron Bruce 418 at 7:00 pm on Mar. 4, 2010.

In this example the geo-located crowd-sourced structural data items may also be temporally filtered to generate a subgroup comprising structural data items that have a timestamp of 7:00 pm on Mar. 4, 2010. Alternatively expressed, the subgroup includes structures and surfaces of the bar 402' as they existed at 7:00 pm on Mar. 4, 2010. Accordingly, the textured shared world model of the bar 402' presented to the user 72 may include the geo-located crowd-sourced structural data items that were captured by the HMD device 422 of patron Bruce 418 at 7:00 pm on Mar. 4, 2010. Additionally, in some examples geo-located crowd-sourced structural data items of the bar 422' that were captured by the HMD device 422 of patron Bruce 418 prior to 7:00 pm on Mar. 4, 2010, and by other capture devices prior to 7:00 pm on Mar. 4, 2010, may also be stitched together and utilized to generate the textured shared world model of the bar 402'.

In another example, the mixed reality experience sharing program 14 is further configured to prioritize the plurality of geo-located crowd-sourced texture data items 30 according to one or more priority factors 82. The priority factors 82 may include, but are not limited to, a fidelity of a crowd-sourced texture data item 30, an age of a crowd-sourced texture data item, a trustworthiness of a source, and a social proximity of a source of a crowd-sourced texture data item.

For example, user 72 may receive two or more geo-located crowd-sourced texture data items 30 that each includes video of the lounge singer 410. Video image quality parameters, such as aspect ratio, geometric distortion, and exposure accuracy, may be determined for each of the texture data items 30. The texture data items 30 may then be prioritized from highest to lowest image quality. In one example, a predetermined image quality threshold may be utilized, wherein only those geo-located crowd-sourced texture data items 30 that include video having an image quality greater than the predetermined image quality are utilized by the mixed reality experience sharing system 10 in the textured shared world model 66. It will be appreciated that a fidelity priority factor may also be utilized with other types of geo-located crowd-sourced texture data items including, but not limited to, still images, audio, holograms, etc.

In another example, user 72 may receive two or more geo-located crowd-sourced texture data items 30 that each includes video of the lounge singer 410 captured at different times. The texture data items 30 may then be prioritized by age of capture date from most recent to oldest. In one example, a predetermined age threshold may be utilized, wherein only those geo-located crowd-sourced texture data items 30 that include video with a capture date on or after the predetermined age threshold are utilized by the mixed reality experience sharing system 10 in the textured shared world model 66. It will be appreciated that an age priority factor may also be utilized with other types of geo-located crowd-sourced texture data items 30 including, but not limited to, still images, audio, holograms, etc.

In another example, user 72 may receive two or more geo-located crowd-sourced texture data items 30 that each includes a hologram received from a different source. The texture data items 30 may then be prioritized by a trustworthiness of the source from which each hologram was received. In one example, a predetermined trustworthiness threshold may be utilized, wherein only those holograms received from sources that exceed the predetermined trustworthiness threshold are utilized by the mixed reality experience sharing system 10 in the textured shared world model 66. The trustworthiness of a source may be based, for example, on whether the source has been certified by one or more certification agencies, or on one or more other suitable factors. It will be appreciated that a trustworthiness priority factor may also be utilized with other types of geo-located crowd-sourced texture data items 30 including, but not limited to, video, still images, audio, etc.

In another example, user 72 may receive two or more geo-located crowd-sourced texture data items 30 that each includes audio received from a different source. The texture data items 30 may then be prioritized by a social proximity of the source from which each audio file was received to the user 72. In one example, a predetermined social proximity threshold may be utilized, wherein only those audio files received from sources that exceed the predetermined social proximity threshold are utilized by the mixed reality experience sharing system 10 in the textured shared world model 66. The social proximity of a source may be based, for example, on whether the source is present on one or more social graphs of the user 72. It will be appreciated that a social proximity priority factor may also be utilized with other types of geo-located crowd-sourced texture data items 30 including, but not limited to, video, still images, holograms, etc.

In another example, the mixed reality experience sharing program 14 is further configured to prioritize the plurality of geo-located crowd-sourced structural data items 28 according to one or more priority factors 82. The priority factors may include, but are not limited to, a fidelity of a crowd-sourced structural data item 28, an age of a crowd-sourced structural data item, a trustworthiness of a source, and a social proximity of a source of a crowd-sourced structural data item. With respect to the examples given above for prioritizing two or more geo-located crowd-sourced texture data items 30, similar examples of prioritizing two or more geo-located crowd-sourced structural data items 28 are also applicable.

As noted above, in some examples, the plurality of crowd-sourced texture data items 30 may include one or more holograms and metadata describing the holograms. The mixed reality experience sharing program 14 may be further configured to locate the hologram within the textured shared world model 66 of the physical environment. With reference again to FIG. 4B, in one example the holographic wizard 450 is geo-located on the stage 424. Metadata describing the holographic wizard 450 may also inform the mixed reality experience sharing program 14 of the source of the wizard, a date of creation, and/or other descriptive information.

Figure 5A:
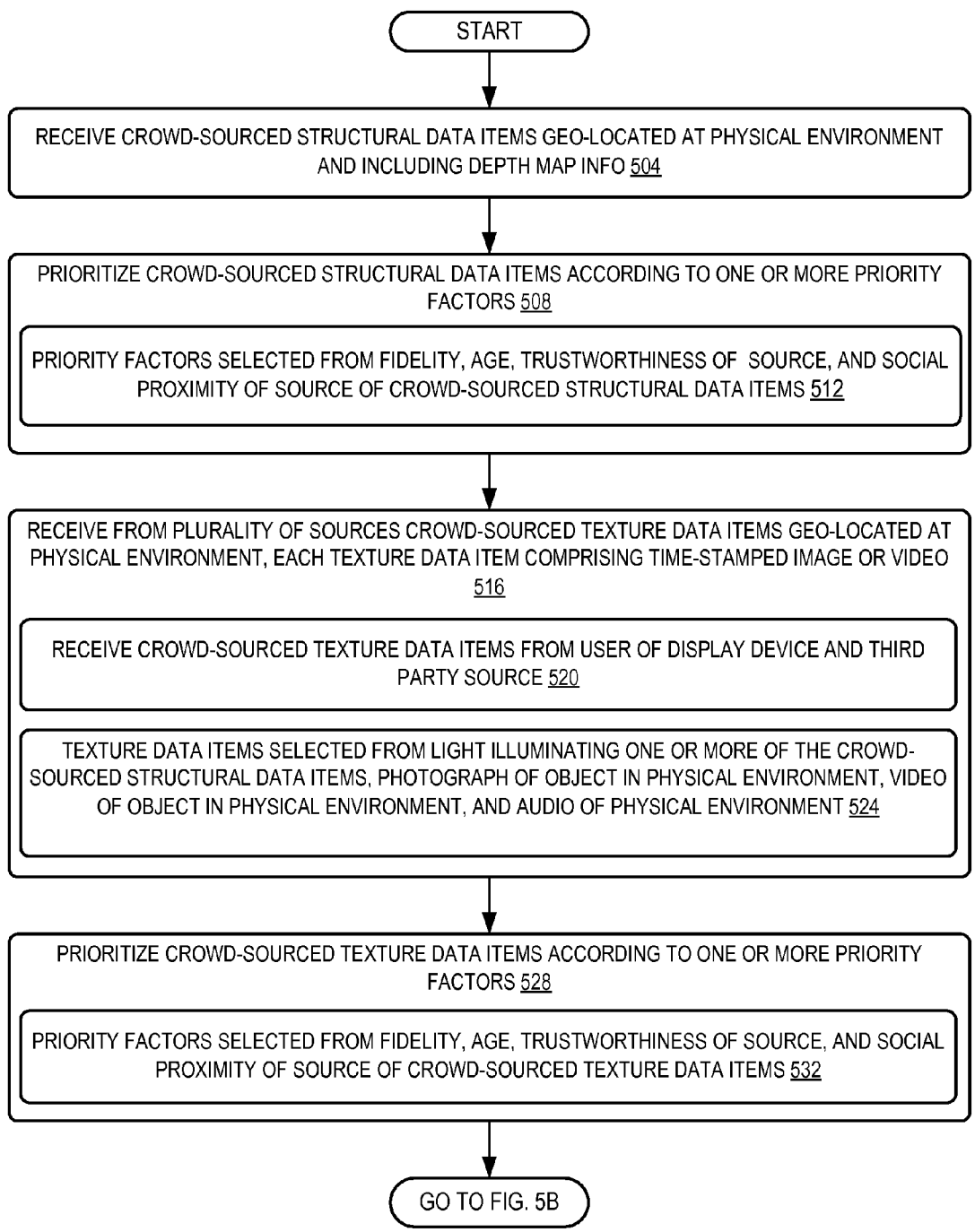

FIGS. 5A and 5B illustrate a flow chart of a method 500 for presenting a mixed reality environment according to an embodiment of the present disclosure. The following description of method 500 is provided with reference to the software and hardware components of the mixed reality experience sharing system 10 described above and shown in FIGS. 1-4. It will be appreciated that method 500 may also be performed in other contexts using other suitable hardware and software components.

With reference to FIG. 5A, at 504 the method 500 includes receiving a plurality of crowd-sourced structural data items that are geo-located at a physical environment and include depth information. At 508 the method 500 includes prioritizing the plurality of crowd-sourced structural data items according to one or more priority factors. At 512 the priority factors may be selected from a fidelity of a crowd-sourced structural data item, an age of a crowd-sourced structural data item, a trustworthiness of a source, and a social proximity of the source of a crowd-sourced structural data item.

At 516 the method 500 includes receiving from a plurality of sources a plurality of crowd-sourced texture data items that are geo-located at the physical environment, each of the texture data items comprising a time-stamped image or video. At 520 the method 500 includes receiving the plurality of crowd-sourced texture data items from at least a user of the display device and a third party source. At 524 each of the plurality of crowd-sourced texture data items may be selected from light illuminating one or more of the crowd-sourced structural data items, an image of an object in the physical environment, a video of an object in the physical environment, and audio of the physical environment.

At 528 the method 500 includes prioritizing the plurality of crowd-sourced texture data items according to one or more priority factors. At 532 the priority factors may be selected from a fidelity, an age, a trustworthiness of a source, and a social proximity of the source of a crowd-sourced texture data item. With reference now to FIG. 5B, at 536 the method 500 includes receiving user input of a temporal filter parameter. At 540 the temporal filter parameter corresponds to a predated time that is earlier than a current time. At 544 the method 500 includes filtering the plurality of crowd-sourced texture data items by the temporal filter parameter to generate a temporally-filtered subgroup of the crowd-sourced texture data items.

At 548 the method includes stitching together the plurality of crowd-sourced structural data items to generate a 3D spatial shared world model of the physical environment. At 552 the method 500 may also include filtering the plurality of crowd-sourced structural data items by the temporal filter parameter to generate a temporally-filtered subgroup of the crowd-sourced structural data items. In this example, at 556 the method 500 includes stitching together the temporally-filtered subgroup of the crowd-sourced structural data items to generate the 3D spatial shared world model of the physical environment.

At 560 the method 500 includes applying to surfaces of the 3D spatial shared world model of the physical environment the temporally-filtered subgroup of the crowd-sourced texture data items to generate the textured shared world model of the physical environment. At 564, where the plurality of crowd-sourced textured data items comprise at least one hologram and metadata describing the hologram, the method 500 includes locating the hologram within the textured shared world model of the physical environment. At 568 the method 500 includes providing the textured shared world model of the physical environment to a display program for display by the display device.

It will be appreciated that method 500 is provided by way of example and is not meant to be limiting. Therefore, it is to be understood that method 500 may include additional and/or alternative steps than those illustrated in FIGS. 5A and 5B. Further, it is to be understood that method 500 may be performed in any suitable order. Further still, it is to be understood that one or more steps may be omitted from method 500 without departing from the scope of this disclosure.

Advantageously, the above-described embodiments of a mixed reality experience sharing system 10 and related method 500 may provide a convenient platform for sharing experiences captured by multiple users of mixed reality devices. Data from multiple users may be selectively combined and/or filtered based on temporal and priority factors. A textured shared world model reflecting an experience of a physical environment from a predated time may also be created and provided.

FIG. 6 schematically shows a nonlimiting embodiment of a computing system 600 that may perform one or more of the above described methods and processes. Computing devices 22 and 36 may take the form of computing system 600. Computing system 600 is shown in simplified form. It is to be understood that virtually any computer architecture may be used without departing from the scope of this disclosure. In different embodiments, computing system 600 may take the form of a mainframe computer, server computer, desktop computer, laptop computer, tablet computer, home entertainment computer, network computing device, mobile computing device, mobile communication device, gaming device, etc.

As shown in FIG. 6, computing system 600 includes a logic subsystem 604 and a storage subsystem 608. Computing system 600 may optionally include a display subsystem 612, a communication subsystem 616, a sensor subsystem 620, an input subsystem 622 and/or other subsystems and components not shown in FIG. 6. Computing system 600 may also include computer readable media, with the computer readable media including computer readable storage media and computer readable communication media. Computing system 600 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 604 may include one or more physical devices configured to execute one or more instructions. For example, the logic subsystem 604 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 604 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 608 may include one or more physical, persistent devices configured to hold data and/or instructions executable by the logic subsystem 604 to implement the herein described methods and processes. When such methods and processes are implemented, the state of storage subsystem 608 may be transformed (e.g., to hold different data).

Storage subsystem 608 may include removable media and/or built-in devices. Storage subsystem 608 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 608 may include devices with one or more of the following characteristics: volatile, nonvolatile, dynamic, static, read/write, read-only, random access, sequential access, location addressable, file addressable, and content addressable.

In some embodiments, aspects of logic subsystem 604 and storage subsystem 608 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 6 also shows an aspect of the storage subsystem 608 in the form of removable computer readable storage media 624, which may be used to store data and/or instructions executable to implement the methods and processes described herein. Removable computer-readable storage media 624 may take the form of CDs, DVDs, HD-DVDs, Blu-Ray Discs, EEPROMs, and/or floppy disks, among others.

It is to be appreciated that storage subsystem 608 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 612 may be used to present a visual representation of data held by storage subsystem 608. As the above described methods and processes change the data held by the storage subsystem 608, and thus transform the state of the storage subsystem, the state of the display subsystem 612 may likewise be transformed to visually represent changes in the underlying data. The display subsystem 612 may include one or more display devices utilizing virtually any type of technology. Such display devices may be combined with logic subsystem 604 and/or storage subsystem 608 in a shared enclosure, or such display devices may be peripheral display devices. The display subsystem 612 may include, for example, the display system 40 of the HMD device 34.

When included, communication subsystem 616 may be configured to communicatively couple computing system 600 with one or more networks and/or one or more other computing devices. Communication subsystem 616 may include wired and/or wireless communication devices compatible with one or more different communication protocols. As nonlimiting examples, the communication subsystem 616 may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

Sensor subsystem 620 may include one or more sensors configured to sense different physical phenomenon (e.g., visible light, infrared light, sound, acceleration, orientation, position, etc.) as described above. Sensor subsystem 620 may be configured to provide sensor data to logic subsystem 604, for example. Such data may include, for example, image information, audio information, ambient lighting information, depth information, position information, motion information, user location information, eye-tracking information, and/or any other suitable sensor data that may be used to perform the methods and processes described above.

When included, input subsystem 622 may comprise or interface with one or more sensors or user-input devices such as a game controller, gesture input detection device, voice recognizer, inertial measurement unit, keyboard, mouse, or touch screen. In some embodiments, the input subsystem 622 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality experience sharing system 10 that is implemented to perform one or more particular functions. In some cases, such a program may be instantiated via logic subsystem 604 executing instructions held by storage subsystem 608. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality experience sharing system for presenting a textured shared world model of a physical environment, the textured shared world model including a plurality of crowd-sourced structural data items that are geo-located at the physical environment, and a plurality of crowd-sourced texture data items that are geo-located at the physical environment, the mixed reality experience sharing system comprising:
   a computing device comprising a processor; and
   a mixed reality experience sharing program executed by the processor of the computing device, the mixed reality experience sharing program configured to:
      receive the plurality of crowd-sourced structural data items including depth information;
      stitch together the plurality of crowd-sourced structural data items to generate a 3D spatial shared world model of the physical environment;
      receive the plurality of crowd-sourced texture data items from a plurality of sources, each of the texture data items comprising a time-stamped image or video, wherein the plurality of crowd-sourced texture data items comprise at least one hologram and metadata describing the hologram;
      receive user input of a temporal filter parameter;
      filter the plurality of crowd-sourced texture data items by the temporal filter parameter to generate a temporally-filtered subgroup of the crowd-sourced texture data items;
      apply to surfaces of the 3D spatial shared world model of the physical environment the temporally-filtered subgroup of the crowd-sourced texture data items to generate the textured shared world model of the physical environment;
      provide the textured shared world model of the physical environment to a display program for display by a display device; and
      locate the hologram within the textured shared world model of the physical environment.

2. The mixed reality experience sharing system of claim 1, wherein the temporal filter parameter corresponds to a predated time that is earlier than a current time.

3. The mixed reality experience sharing system of claim 2, wherein the mixed reality experience sharing program is further configured to:
   filter the plurality of crowd-sourced structural data items by the temporal filter parameter to generate a temporally-filtered subgroup of the crowd-sourced structural data items; and
   stitch together the temporally-filtered subgroup of the crowd-sourced structural data items to generate the 3D spatial shared world model of the physical environment.

4. The mixed reality experience sharing system of claim 1, wherein the mixed reality experience sharing program is further configured to receive the plurality of crowd-sourced texture data items from at least a user of the display device and a third party source.

5. The mixed reality experience sharing system of claim 1, wherein each of the plurality of crowd-sourced texture data items is selected from the group consisting of light illuminating one or more of the crowd-sourced structural data items, an image of an object in the physical environment, a video of an object in the physical environment, and audio of the physical environment.

6. The mixed reality experience sharing system of claim 1, wherein the mixed reality experience sharing program is further configured to prioritize the plurality of crowd-sourced structural data items according to one or more of a fidelity, an age, a trustworthiness of a source, and a social proximity of the source of the crowd-sourced structural data items.

7. The mixed reality experience sharing system of claim 1, wherein the mixed reality experience sharing program is further configured to receive the plurality of crowd-sourced structural data items from at least one head-mounted display device.

8. The mixed reality experience sharing system of claim 1, wherein the mixed reality experience sharing program is further configured to prioritize the plurality of crowd-sourced texture data items according to one or more of a trustworthiness of a source and a social proximity of the source of the crowd-sourced texture data items.

9. A method for presenting a textured shared world model of a physical environment via a display device, the method comprising:
  receiving a plurality of crowd-sourced structural data items that are geo-located at the physical environment and include depth information;
  stitching together the plurality of crowd-sourced structural data items to generate a 3D spatial shared world model of the physical environment;
  receiving from a plurality of sources a plurality of crowd-sourced texture data items that are geo-located at the physical environment, each of the crowd-sourced texture data items comprising a time-stamped image or video, wherein the plurality of crowd-sourced texture data items comprise at least one hologram and metadata describing the hologram;
  receiving user input of a temporal filter parameter;
  filtering the plurality of crowd-sourced texture data items by the temporal filter parameter to generate a temporally-filtered subgroup of the crowd-sourced texture data items;
  applying to surfaces of the 3D spatial shared world model of the physical environment the temporally-filtered subgroup of the crowd-sourced texture data items to generate the textured shared world model of the physical environment;
  providing the textured shared world model of the physical environment to a display program for display by the display device; and
  locating the hologram within the textured shared world model of the physical environment.

10. The method of claim 9, wherein the temporal filter parameter corresponds to a predated time that is earlier than a current time.

11. The method of claim 10, further comprising:
  filtering the plurality of crowd-sourced structural data items by the temporal filter parameter to generate a temporally-filtered subgroup of the crowd-sourced structural data items; and
  wherein stitching together the plurality of crowd-sourced structural data items comprises stitching together the temporally-filtered subgroup of the crowd-sourced structural data items to generate the 3D spatial shared world model of the physical environment.

12. The method of claim 9, further comprising receiving the plurality of crowd-sourced texture data items from at least a user of the display device and a third party source.

13. The method of claim 9, wherein each of the plurality of crowd-sourced texture data items are selected from the group consisting of light illuminating one or more of the crowd-sourced structural data items, an image of an object in the physical environment, a video of an object in the physical environment, and audio of the physical environment.

14. The method of claim 9, further comprising prioritizing the plurality of crowd-sourced structural data items according to one or more of a fidelity, an age, a trustworthiness of a source, and a social proximity of the source of the crowd-sourced structural data items.

15. The method of claim 9, further comprising prioritizing the plurality of crowd-sourced texture data items according to one or more of a trustworthiness of a source and a social proximity of the source of the crowd-sourced texture data items.

16. A mixed reality experience sharing system for presenting a textured shared world model of a physical environment, the textured shared world model including a plurality of crowd-sourced structural data items that are geo-located at the physical environment, and a plurality of crowd-sourced texture data items that are geo-located at the physical environment, the mixed reality experience sharing system comprising:
  a computing device comprising a processor; and
  a mixed reality experience sharing program executed by the processor of the computing device, the mixed reality experience sharing program configured to:
    receive the plurality of crowd-sourced structural data items including depth information;
    stitch together the plurality of crowd-sourced structural data items to generate a 3D spatial shared world model of the physical environment;
    receive the plurality of crowd-sourced texture data items from a plurality of sources, each of the texture data items comprising a time-stamped image or video, wherein the plurality of crowd-sourced texture data items comprise at least one hologram and metadata describing the hologram;
    receive user input of a temporal filter parameter corresponding to a predated time that is earlier than a current time;
    filter the plurality of crowd-sourced texture data items by the temporal filter parameter to generate a temporally-filtered subgroup of the crowd-sourced texture data items;
    apply to surfaces of the 3D spatial shared world model of the physical environment the temporally-filtered subgroup of the crowd-sourced texture data items to generate the textured shared world model of the physical environment;
    provide the textured shared world model of the physical environment to a display program for display by a display device; and
    locate the hologram within the textured shared world model of the physical environment.

17. The mixed reality experience sharing system of claim 16, wherein the mixed reality experience sharing program is further configured to prioritize the plurality of crowd-sourced texture data items according to one or more of a trustworthiness of a source and a social proximity of the source of the crowd-sourced texture data items.

* * * * *